(12) United States Patent
Rosel

(10) Patent No.: US 7,952,575 B2
(45) Date of Patent: May 31, 2011

(54) COMPUTER-IMPLEMENTED PROCESS AND SYSTEM FOR CREATING A PARAMETRIC SURFACE

(75) Inventor: Sébastien Rosel, Gif-sur-Yvette (FR)

(73) Assignee: Dassault Systemes, Suresnes, Cedex (FR)

( * ) Notice: Subject to any disclaimer, the term of this patent is extended or adjusted under 35 U.S.C. 154(b) by 835 days.

(21) Appl. No.: 11/780,792

(22) Filed: Jul. 20, 2007

(65) Prior Publication Data

US 2008/0225043 A1 Sep. 18, 2008

(30) Foreign Application Priority Data

Jul. 21, 2006 (EP) .................................... 06291189

(51) Int. Cl.
*G60T 17/00* (2006.01)
(52) U.S. Cl. ........ 345/420; 345/419; 345/421; 345/441; 345/442
(58) Field of Classification Search .......... 345/419–423, 345/428, 581, 582, 606, 441, 442; 703/2; 704/2
See application file for complete search history.

(56) References Cited

U.S. PATENT DOCUMENTS

| | | | |
|---|---|---|---|
| 6,603,473 B1 * | 8/2003 | Litke et al. ..................... | 345/420 |
| 6,636,853 B1 | 10/2003 | Stephens, Jr. | |
| 6,806,874 B2 * | 10/2004 | Biermann et al. ............ | 345/420 |
| 6,920,419 B2 * | 7/2005 | Kitamura et al. ................. | 704/2 |
| 7,023,435 B1 * | 4/2006 | Litke et al. ..................... | 345/420 |
| 7,200,532 B1 * | 4/2007 | Cheng ............................... | 703/2 |
| 7,369,972 B2 * | 5/2008 | Boier-Martin et al. ........... | 703/2 |
| 7,400,323 B2 * | 7/2008 | Nigro ............................ | 345/420 |
| 7,595,799 B2 * | 9/2009 | Nigro ............................ | 345/420 |
| 2002/0152222 A1 | 10/2002 | Holbrook | |
| 2009/0102833 A1 * | 4/2009 | Boier-Martin et al. ....... | 345/419 |

FOREIGN PATENT DOCUMENTS

| | | |
|---|---|---|
| EP | 1 881 458 A1 | 1/2008 |
| EP | 1 883 020 A1 | 1/2008 |
| WO | WO 03/098477 A1 | 11/2003 |

OTHER PUBLICATIONS

Biermann, H., et al., "Sharp Features on Multiresolution Subdivision Surfaces," Computer Graphics and Applications, Proceedings. Ninth Pacific Conference, *IEEE*:140-149 (2001).

Ma, W. and Zhao, N., "Smooth Multiple B-spline Surface Fitting With Catmull-Clark Subdivision Surfaces for Extraordinary Corner Patches," *The Visual Computer* 18:415-436 (2002).

(Continued)

*Primary Examiner* — Kimbinh T Nguyen
(74) *Attorney, Agent, or Firm* — Hamilton, Brook, Smith & Reynolds, P.C.

(57) ABSTRACT

The invention is directed to a computer program product, a computer system, computer apparatus and a computer-implemented method for creating a parametric surface. The invention provides a base mesh having a plurality of outer or inner vertices with valence greater than two. The vertices define faces and at least one of the vertices is an extraordinary vertex. The invention converts faces of the base mesh into parametric elementary surfaces and trims at least one of said parametric elementary surfaces located in the vicinity of the extraordinary vertex. Trimming is performed according to: (i) at least two parametric elementary surfaces adjacent to a subject parametric elementary surface; and (ii) the base mesh. Next the invention constructs at least one parametric elementary surface, adjacent to the trimmed parametric elementary surface, wherein the resulting parametric elementary surfaces form the parametric surface.

20 Claims, 8 Drawing Sheets

OTHER PUBLICATIONS

Ying, L., et al., "Nonmanifold Subdivision," Proceedings of the Conference Visualization '01, San Diego, California, pp. 325-331, 359 (2001).

Zorin, D., "Classical Subdivision Surfaces II," Lecture No. 15 of Course CS 448-Topics in Computer Graphics-Mathematical Methods for Computer Graphics, Stanford University, (Dec. 1997).

* cited by examiner

COMPUTER-IMPLEMENTED PROCESS AND SYSTEM FOR CREATING A PARAMETRIC SURFACE

RELATED APPLICATION

This application claims priority under 35 U.S.C. §119 or 365 to European Patent Application No. EP 06291189.6, filed Jul. 21, 2006.

The entire teachings of the above application are incorporated herein by reference.

FIELD OF THE INVENTION

The invention relates to the field of computer-aided design, and more specifically to computer-aided creation of parametric surfaces, in particular parametric surfaces having a trimmed elementary surface.

BACKGROUND OF THE INVENTION

A number of systems and programs are offered on the market for the design of parts or assemblies of parts, such as the one provided by the applicant under the trademark CATIA. These so-called computer-aided design (CAD) systems allow a user to construct and manipulate complex three-dimensional (3D) models of parts or assembly of parts.

Creation of 3D computer graphics involves various steps, including modeling and process steps (subdivision of base meshes, conversion into parametric surfaces, rendering . . . ).

A number of different modeling techniques can be used to create a model of an assembly. These techniques include solid modeling, wire-frame modeling, and surface modeling. Solid modeling techniques provide for topological 3D models, where the 3D model is a collection of interconnected edges and faces, for example. Geometrically, a 3D solid model is a collection of trimmed or delimited surfaces that defines a closed skin. The trimmed surfaces correspond to the topological faces bounded by the edges. The closed skin defines a bounded region of 3D space filled with the part's material. Wire-frame modeling techniques, on the other hand, can be used to represent a model as a collection of simple 3D lines, whereas surface modeling can be used to represent a model as a collection of exterior surfaces. CAD systems may combine these, and other, modeling techniques, such as parametric modeling techniques. CAD systems thus provide a representation of modeled objects using edges or lines, in certain cases with faces. The modeled objects comprises a number of lines or edges; these may be represented in various manners, e.g. non-uniform rational B-splines (NURBS), Bezier curves or other algorithms describing a curve.

Regarding process steps, CAD programs generally make use of base meshes during the modeling of objects. Base meshes are networks of interconnected elementary polygons, such as triangles or quadrangles.

A base mesh is modified by the user during design to obtain the required model, and then is converted into a plurality of parametric surfaces such as NURBS or B-Splines.

Concerning the modeled products: modern consumer products are often characterized by smoothly flowing shapes, the complexity of which exceeds simple analytical surfaces, such as planes, boxes and cylinders. Such products are instead typically modeled using spline curves and surfaces or the like. When designing a product, smoothness of object surfaces is a main concern. Consequently, 3D modelers usually have an assortment of tools for creating smooth surfaces.

In the following, "curvature" will be used as a geometry term indicating the extent that a curve or surface deviates from perfect straightness or flatness. Curvature is usually measured as the inverse of a local osculating radius. Thus, a curve has a low curvature and a large radius when it is slightly bent only, and has a high curvature and a small radius if bent sharply. While curvature is constant for arcs, circles, or for surfaces based thereon; the curvature of more complex curves such as splines (and surfaces based thereon) continually changes along the length of the curve.

Furthermore, the term "continuity" will be used for describing offsets (or relationships) between points along a curve or on a surface and also between abutting curves or surfaces. Such relationships may fall into different levels of continuity, which are usually: C0, C1, and C2. C0 denotes a position continuity only (as in the case of abutting curves/surfaces). Curves show in this case a kink at the C0 point. Similarly, surfaces have a sharp crease along the C0 seam. Abutting curves and surfaces touch one another, but they have no curvature similarities. C1 denotes a continuity level augmented with tangent continuity, and C2 adds the curvature continuity. Where curvatures on both sides of a point in a curve are equal, the curve is seamless.

It will actually here be made reference to G0, G1, and G2 "geometrical" continuities, which slightly differ on the mathematical point of view, as known in the art. For example, two joining curve segments have Gn continuity if $n^{th}$ order derivatives of respective curves have the "same direction" at the join (proportionality defined by some matrix is sufficient, equality is not required). As a result, Cn implies Gn while the reciprocal is not necessarily true.

Amongst the core techniques of surface modeling, one generally makes use of piecewise low-order algebraic surfaces or implicit patches. Patches are parametric elementary surfaces controlled via a grid of control points, whereby they can be deformed. An important issue in using patches is that patches must be adequately joined to ensure geometric continuity along the patch boundaries. Typically, the patch cells are recursively subdivided to make it possible to adapt the local curvature to a given continuity requirement.

In numerous applications (such as computer graphics), subdivision surfaces such as Catmull-Clark, are used to approximate a surface derived from a base mesh. In particular, Catmull-Clark subdivision surfaces are now a standard for smooth free-form surface modeling. Subdivision surfaces are used to create smooth surfaces out of arbitrary meshes, that is, with arbitrary topology. They are defined as the limit of an infinite refinement process. A key concept is refinement: by repeatedly refining an initial polygonal mesh, a sequence of meshes is generated that converges to a resulting subdivision surface. Each new subdivision step generates a new mesh that has more polygonal elements and is smoother. In particular, Catmull-Clark subdivision surfaces can be seen as a generalization of bi-cubic uniform B-splines. An important point is that the generated mesh will mainly consist of quadrilaterals, so that the expected valence (or coordination number) of an ordinary vertex is four.

Besides, a distinction is sometimes made between open and closed vertex. Open/closed vertices are concepts known in the art. In short: suppose a vertex v be surrounded and joined by edges E1, E2, En+1, such that En+1=E1, said vertex is considered to be closed if none of the edges is a sharp edge.

Another concept in the field is that of inner/outer vertices. A vertex is said "inner" or "outer" depending on its position, that is, inside the mesh or on a border.

Keeping the above definitions in mind, the terminology "extraordinary vertex" will hereafter be used to denote vertices which are different from:
- an outer vertex with valence two;
- an outer vertex with valence three; or
- a inner vertex with valence four.

Hence, inner vertices of valence three or vertices of valence five are extraordinary vertices.

In the field of CAD, subdivision surfaces are not commonly accepted as they are not parametric. Thus, CAD systems provide conversion algorithms to convert a subdivision surface into a parametric surface consisting of a set of surface patches, such as NURBS patches.

Nevertheless, the resulting parametric surfaces give rise to an insufficient quality of continuity. Indeed, those surfaces are everywhere curvature continuous except at points corresponding to vertices incident on extraordinary vertices of the initial base mesh.

In this respect, a number of existing processes for creating parametric surfaces skip the continuity problem caused by extraordinary vertices. The surface quality produced in the case of extraordinary vertices is therefore insufficient for the production of CAD surfaces, in particular surfaces of aesthetical shapes.

The same problem occurs when sharp edges are present. In addition, extraordinary inner vertices with valence three give rise to produce surfaces which, in practice, cannot be offset (that is, duplicated while maintained parallel to the initial surface), this being a critical problem for CAD integration.

Hence, in short, there is a need for a method of creating a parametric surface, which would make it possible to fulfill the following requirements:
- satisfy a given geometrical continuity Gi (for example G1 or G2) requirement; and
- be compatible with sharp edges so as to allow for creation of offset surfaces.

SUMMARY OF THE INVENTION

The present invention therefore proposes a computer-implemented method for creating a parametric surface, comprising the steps of:
- providing a base mesh having a plurality of outer or inner vertices with valence greater than two, said vertices defining faces and at least one of said vertices being an extraordinary vertex defined as being different from:
  - an outer vertex with valence two,
  - an outer vertex with valence three or
  - a inner vertex with valence four;
- converting faces of the base mesh into parametric elementary surfaces;
- trimming at least one of said parametric elementary surfaces located in the vicinity of said extraordinary vertex, according to:
  - at least two parametric elementary surfaces adjacent to said at least one parametric elementary surface and the base mesh; and
- constructing at least one parametric elementary surface, adjacent to said trimmed parametric elementary surface, wherein the resulting parametric elementary surfaces form the parametric surface.

In other embodiments, the method according to the invention may comprise one or more of the following features:
- the step of trimming comprises steps of: defining said at least one parametric elementary surface according to the base mesh; defining a trimming curve within said at least one parametric elementary surface, according to said adjacent elementary surfaces; and relimiting said at least one parametric elementary surface according to the trimming curve;
- the step of defining said at least one parametric elementary surface uses a sweeping algorithm, said algorithm comprising: defining multiple guides from boundaries of surrounding patches; and sweeping a profile curve along said multiple guides;
- the step of defining said at least one parametric elementary surface uses a loft algorithm, said algorithm comprising filling an area according to at least two curves defined from boundaries of surrounding patches;
- the step of defining said at least one parametric elementary surface comprises matching said at least one parametric elementary surface with the base mesh;
- said trimming curve is further defined according to lengths of edges separating said at least one parametric elementary surface from said at least two adjacent parametric elementary surfaces;
- said at least one parametric elementary surface in the vicinity of said extraordinary vertex is chosen according to an area thereof;
- the parametric surface is created so as to have a required Gi geometrical continuity;
- the base mesh is subdivided according to the Catmull-Clark subdivision rules;
- at the step of converting, each parametric elementary surface has:
  - elementary edges, with elementary vertices joining adjacent elementary edges; and
  - an internal continuity Cj at least equal to the required geometrical continuity Gi, the geometrical continuity between at least two elementary surfaces, across an elementary edge, being less than the required continuity Gi,
- the method according to the invention further comprising, for each singular elementary vertex joining at least one edge across which the continuity between adjacent elementary surfaces is less than the required continuity Gi:
  - defining a system of equations linking parameters of the parametric elementary surfaces across edges joined to said singular vertex and enforcing the required continuity Gi across the joined edges; and
  - solving the system of equations to obtain the parameters;
- the method according to the invention further comprises a step of providing a graphical user interface adapted for displaying said base mesh and parametric elementary surfaces;
- said base mesh and parametric elementary surfaces are displayed in 3D; and/or
- the step of providing the base mesh comprises steps of: identifying a mesh pattern; and creating a base mesh from the mesh pattern, according to a symmetry operation, said base mesh being symmetric with respect to said symmetry operation;

Moreover, the invention is directed to a computer program product, comprising code means designed for implementing steps according to the method of the invention; and to a computer system or apparatus, comprising means designed for implementing steps according to said method.

Furthermore, to the best of the knowledge of the inventor, whilst suggesting some features and variations relevant to creation of parametric surfaces in general, the prior art has not disclosed some of the highly advantageous features of the present invention discussed herein.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

A system embodying the invention will now be described, by way of non-limiting example, and in reference to the accompanying drawings, where.

DETAILED DESCRIPTION OF THE INVENTION

A description of example embodiments of the invention follows.

Before entering details of the invention, a number of concepts and drawbacks of the prior art discussed above shall be exemplified in reference to FIGS. 1-7.

Figure 1:
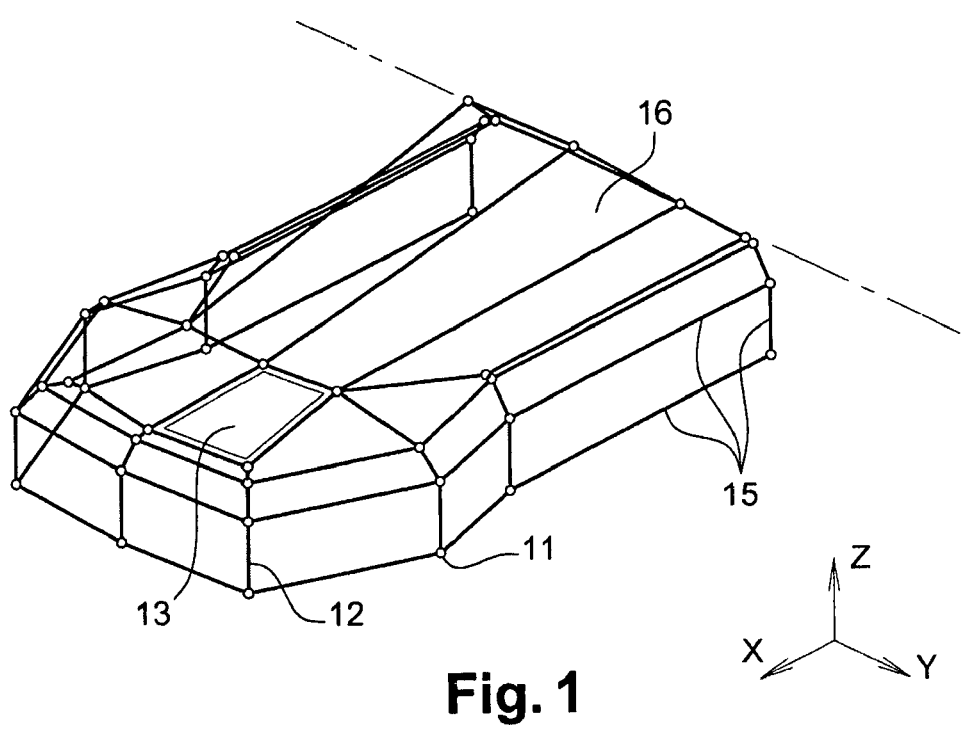
FIG. 1 shows a mesh of a subdivision surface and a resulting subdivision surface.

An example of a mesh 15 of a subdivision surface and a resulting subdivision surface 16 is depicted in FIG. 1. The mesh comprises:
- vertices such as vertex 11 (a vertex is hence a point of the mesh),
- edges such as edge 12 (edges are lines connecting two vertices), and
- faces such as face 13, which are formed by loops of at least three or more edges.

Figure 2:
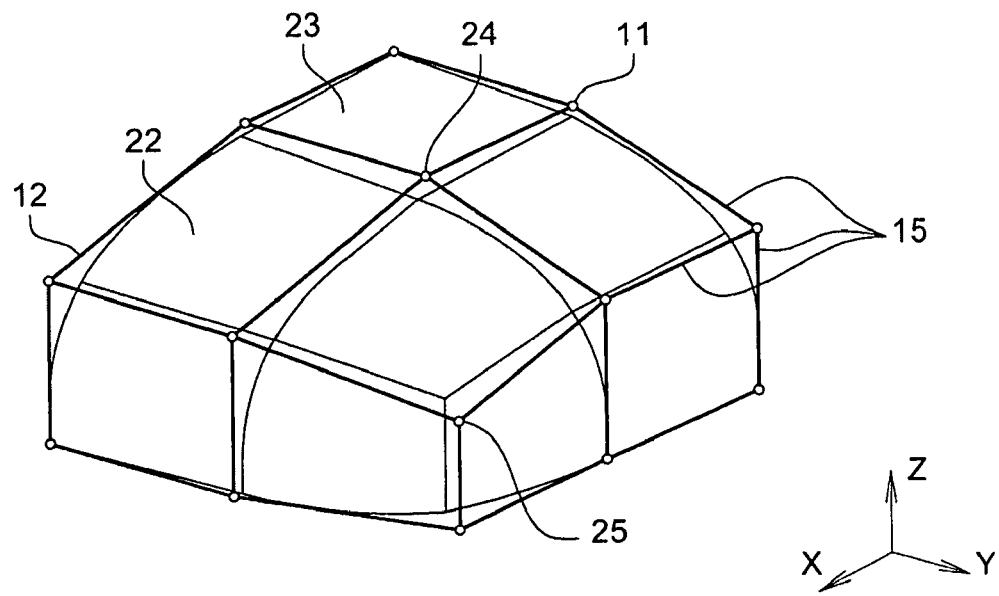
FIG. 2 provides an example of parametric surface consisting of a set of surface patches.

In FIG. 2, another example of a parametric surface is schematized, consisting of a set of surface patches 22, 23. The mesh 15 comprises vertices, e.g. vertices 11, 24, 25 and edges such as edge 12. The valence is a coordination number. In practice, the valence is a feature of a vertex, equal to the number of edges joined to said vertex. Another feature, as defined above, is whether the vertex is said "inner" or "outer", e.g. inside the mesh or on a border. Note that vertex 24 is an ordinary vertex of valence four (inner), while vertex 25 (inner, valence three) is an extraordinary vertex. Problems of continuity are likely to occur in the vicinity of inner three-fold coordinated vertex 25.

Figure 3:
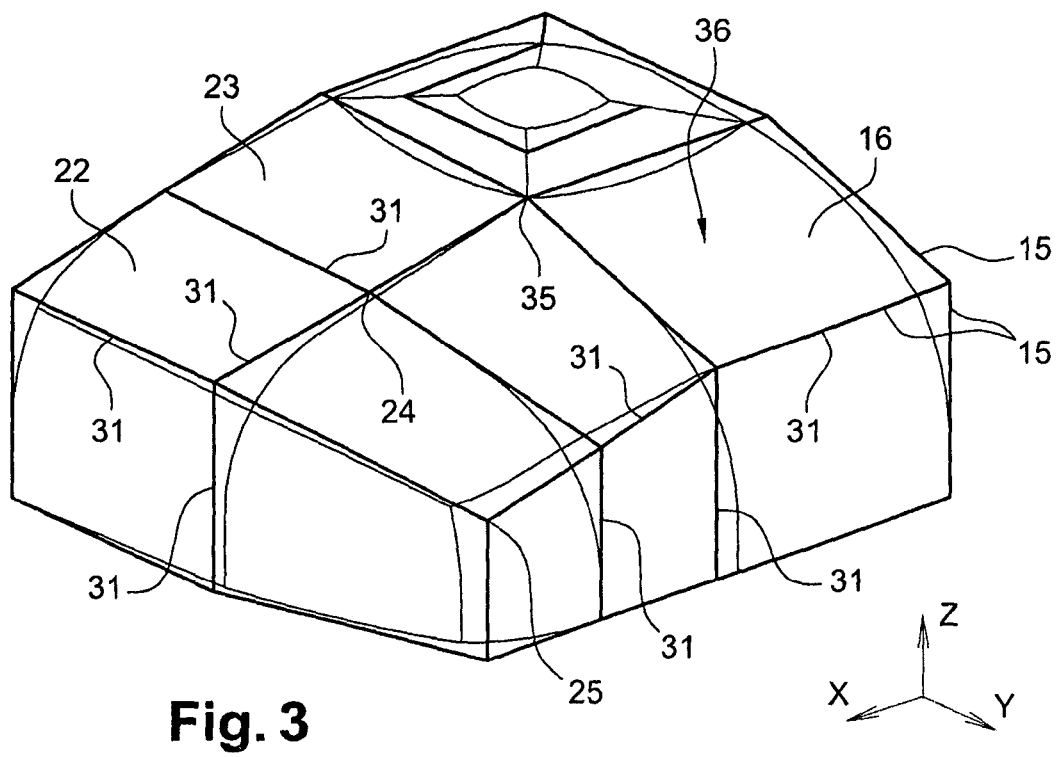
FIG. 3 shows another example of parametric surface with a set of surface patches, close to that of FIG. 2 and illustrating the connectivity between patches.

In reference to FIG. 3, another example of parametric surface 16 with surface patches 22, 23 is illustrated. Said parametric surface 16 is actually close to that of FIG. 2, yet exhibiting an additional section 36 beyond vertex 35 (note in passing that the latter has valence five). As in the example of FIG. 2, vertices 24 and 25 are present, having respectively valences four and three.

As discussed above, the connectivity between patches is a critical question, which markedly impacts the final surface quality. Because subdivisions are equivalent to polygons, one needs to construct Nurbs or Bezier surfaces to ensure that any point of the surface is defined and can be evaluated. This makes it possible to use subdivision surfaces in a CAD system.

Several known algorithms can be implemented to construct said patches and ensure some connectivity between said patches, at least when said patches are regular patches. Regular cases are those e.g. relating to edges having:
- two inner vertexes of valence four;
- two outer vertexes with valence three; and
- One outer vertex of valence three and one inner vertex with valence four.

More formal definitions can be found in the art.

The connection of patches for regular cases can easily be fulfilled using known algorithms. The Curvature continuity (G2) and beyond (e.g. G3) can be reached. This means that patches are tangency connected, and the curvatures of the patches involved at the boundary connection are equal.

In the example of FIG. 3, references 31 denote examples of patches connectivity of G2 continuity level. In particular, the connection of the four patches joined to vertex 24 of valence 4 can match G2 continuity at the connection edges using known algorithms. Otherwise put, if corresponding curvatures were drawn transversally to said patches, such curves would exhibit a continuous smooth shape, (see an example in FIG. 9). Accordingly, where there are two or four patches to connect around one point, G2 continuity can be reached.

In contrast, the cases corresponding to extraordinary vertexes (e.g. different from regular vertices) are likely to generate continuity problems. This occurs for instance in FIG. 3, wherein G2 continuity level cannot be reached near vertex 25 (extraordinary vertex, inner, valence three, see also FIG. 4).

Figure 4:
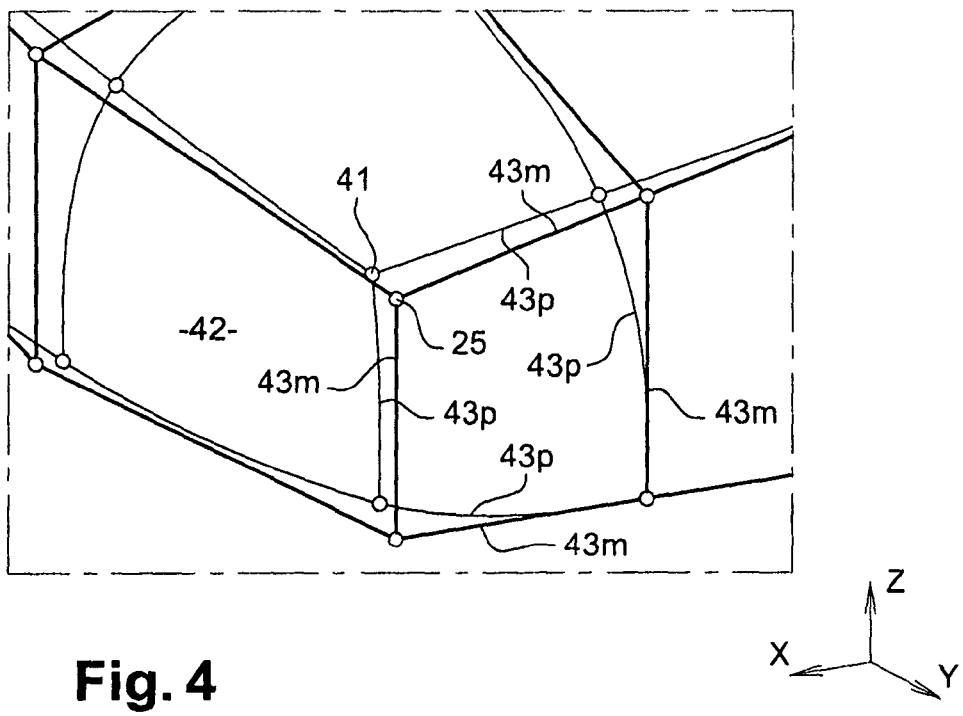
FIG. 4 focuses on a detail of FIG. 3, where an extraordinary inner vertex with valence three is present.

A detail of FIG. 3 is shown in FIG. 4, which focuses on the extraordinary inner vertex 25 of the mesh. Usually, one seeks to build a patch 41, 42, 43p for each face of the mesh. As illustrated in FIG. 4 through references 43m and 43p (m is for mesh and p is for patch), a face results from edges of the mesh while a patch 43p has distinct edges, bound to vertices distinct from the vertices of the mesh. Still, the resulting patches are close to the subdivision limit shape. Incidentally, such patches are classically not topologically relimited.

Figure 5:
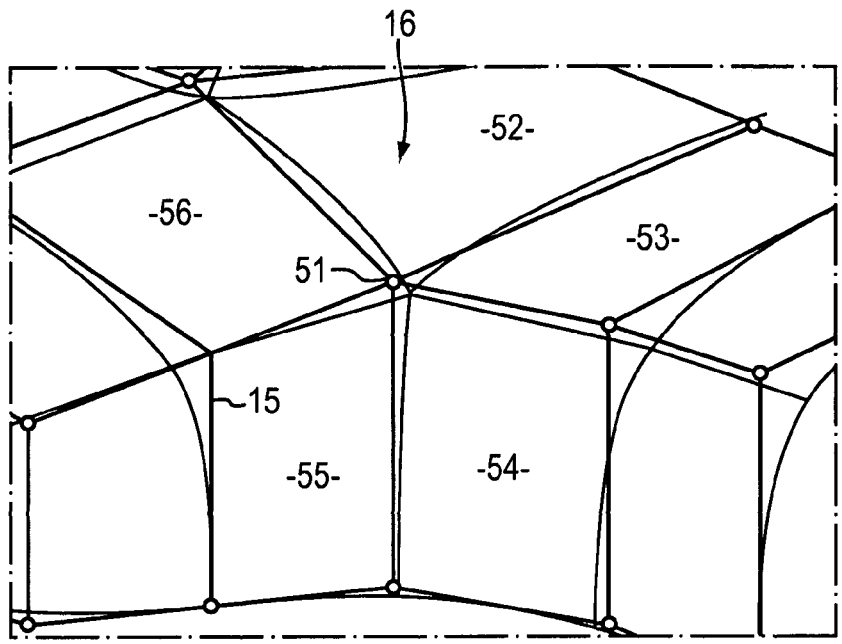
FIG. 5 shows a detail of another parametric surface with a set of surface patches, where an extraordinary inner vertex with valence five takes place.

FIG. 5 shows a detail of another parametric surface 16 formed according to mesh 15, which comprises a set of surface patches 52-56 near an extraordinary inner vertex 51 of the mesh 15. Again, problems are likely to occur near such a vertex, as discussed above in reference to FIG. 3, for vertex 25. Indeed, the known algorithms can hardly produce curvature continuity at the patch connection. The resulting shapes then presents visual defects, which in turn restricts the use of subdivisions in the CAD world.

Figure 6:
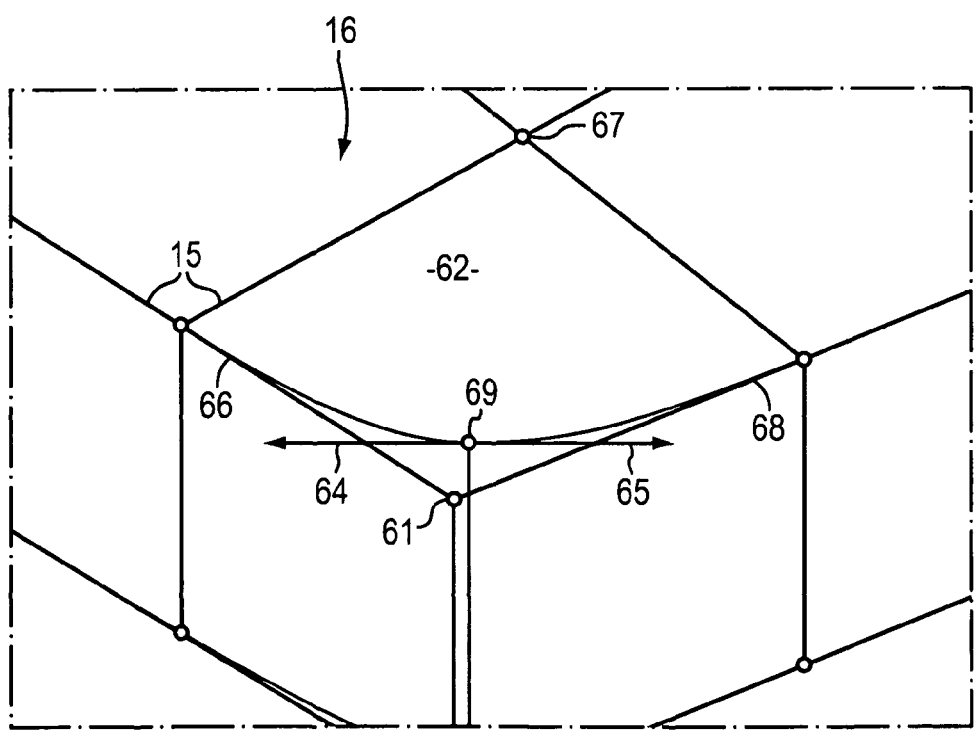
FIG. 6 exhibits another example of parametric surface having two sharp edges, where the base mesh comprises an extraordinary inner vertex with valence three.
Figure 7:
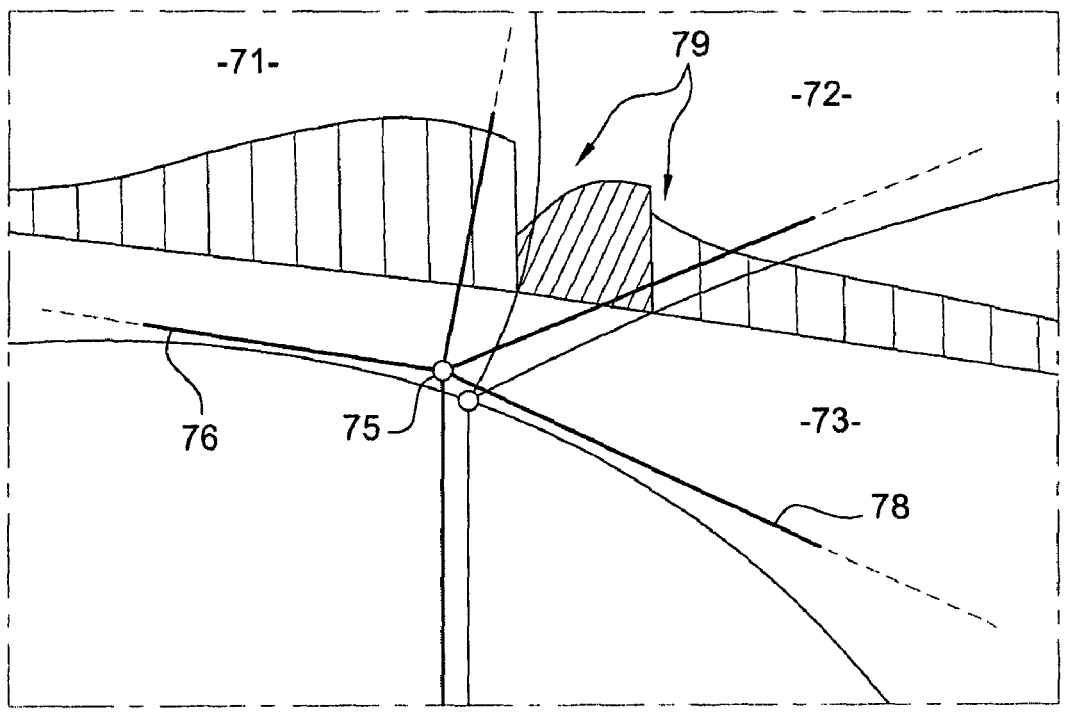
FIG. 7 illustrates curvature discontinuities occurring at the connection of three patches near a inner vertex of valence five.

In reference to FIG. 6, another example of a parametric surface 16 is shown, wherein two sharp edges are present. Subdivision schemes usually provide for the possibility of using internal sharp edges by setting attributes on the edges of the base mesh. A number of combinations can hence be achieved using several paths on the mesh. As in the normal mode (no sharp edge), the surface construction typically produces a patch for each face of the mesh. The resulting shape is then likely to show tangency discontinuities at the junction of the patches impacted by the sharp edges.

This is illustrated in FIG. 6, wherein the face of the base mesh 15 having the 2 sharp edges 66, 68 (joining at extraordinary inner vertex 61 of valence three) produces a patch 62 with collinear tangents 64, 65 at the corner 69, In other words, the corner is degenerated. A problem occurring in this case is that such a patch 62 cannot be used to produce an offset surface, as the computation of offsets requires computing a normal vector via a vector product. As a vector product of collinear vectors gives zero, a normal vector cannot be computed at the corner 69. Such a situation leads to serious concerns in designing thick solids.

Next, as another example (FIG. 7), in the case of two sharp edges 76, 78 joining a inner valence five vertex 75, the same connection defects appears as in the normal situation (where no sharp edge exists). As a result, curvature discontinuities 79 occur at the connection of three patches 71-73.

In response to the above drawbacks, the invention proposes a method, wherein, in addition to converting faces of the base mesh into patches (e.g. parametric elementary surfaces), it is proceeded to a trimming of at least one of the patches in the vicinity of the critical extraordinary vertex. In particular, and as will be exemplified later, said trimming operation rely on two or more adjacent (preferably regular) patches and on the base mesh. Therefore, how the trimming must be performed is locally determined, such that the trimming process remains linear. Furthermore, the base mesh determines the trimming step, yielding a systematic and reproducible trimming of the patch, which could by no means be manually achieved. The construction of trimmed patches may use known algorithms (for instance loft or sweep algorithms) and trimming curves. Next, at least one complementary patch can be constructed, adjacent to the trimmed patch, using the above trimmed patches and surrounding regular patches. Incidentally, it might be proceeded to an automatic or semi-automatic trimming, wherein options can be user-specified.

As a result, conversion can be completed using known algorithm so as to achieve a given continuity. Besides, such a scheme is compatible with sharp edges and preserves creation of offset surfaces, as described below. Accordingly, a full integration of the subdivision scheme in the CAD system is made possible.

Figure 8:
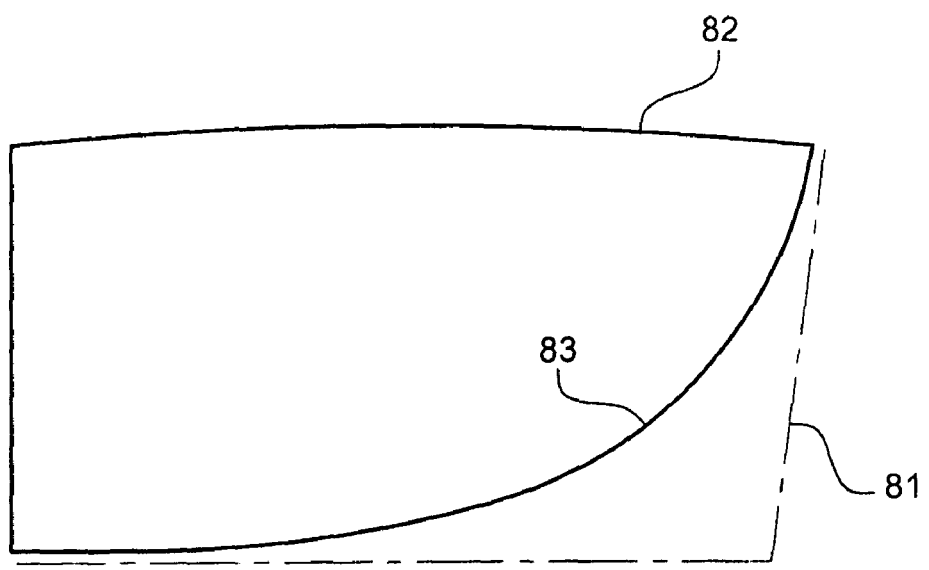
FIG. 8 is a schematic representation of a trimmed patch.

As known, a trimmed surface is a topologically relimited patch. Accordingly, the method is likely to comprise a step of defining a trimming curve 83 (in reference to FIG. 8) within the critical untrimmed patch 81. Then, said patch 81 is relimited according to the trimming curve 83, resulting in the trimmed patch 82. Connecting an adjacent patch 92 (FIG. 9) to a trimmed patch 82 can then be carried out using known algorithms. The resulting connection can reach the curvature continuity (G2) or even more (G3).

Figure 9:
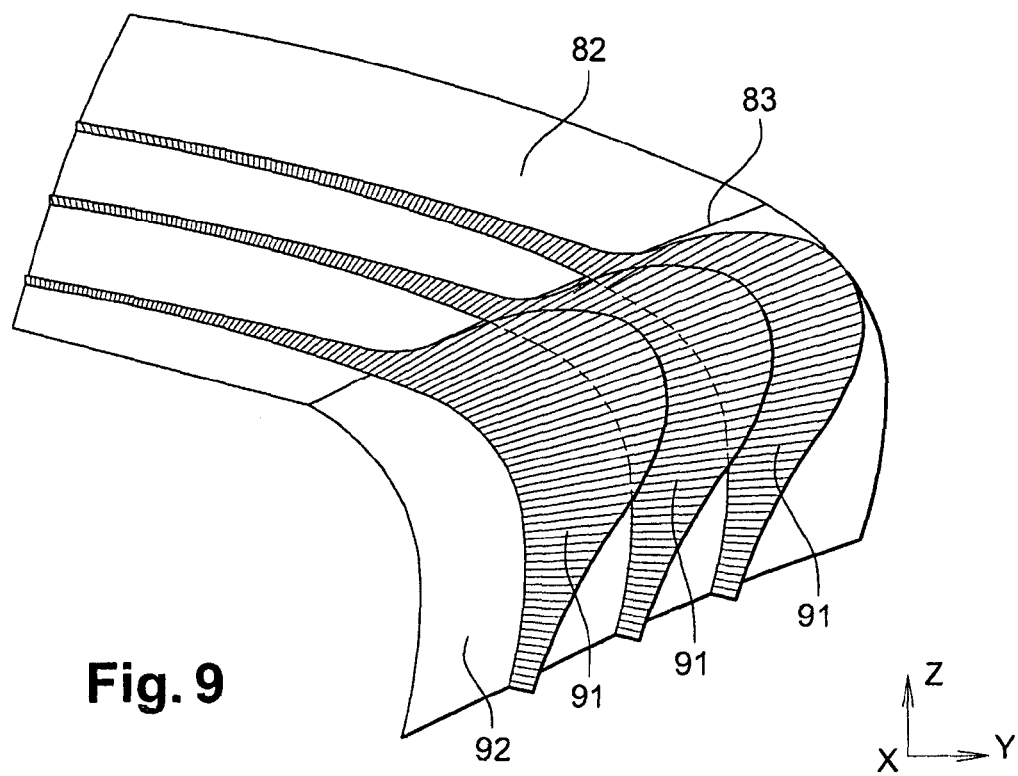
FIG. 9 illustrates curvature continuities occurring at a connection involving a trimmed patch.

Accordingly and as illustrated in FIG. 9, the resulting curvature continuities 91 occurring at the connection 83 reflect a G2 continuity level.

Figure 10:
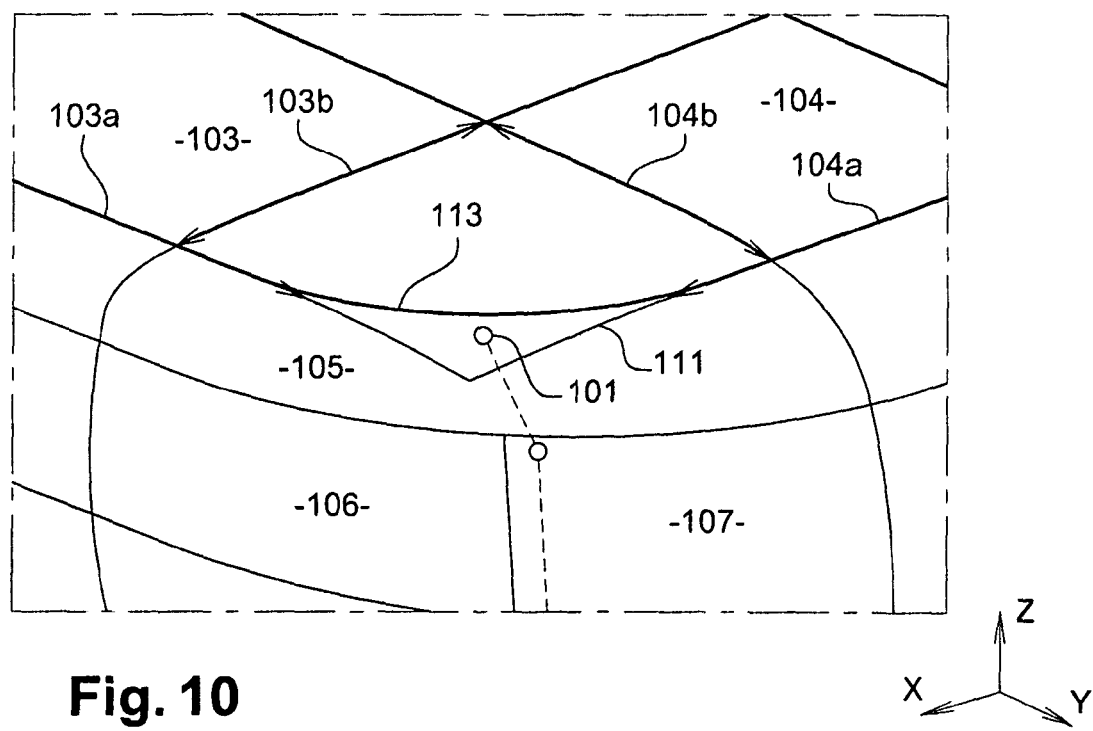
FIGS. 10-11 exemplify the creation of a trimmed patch near an extraordinary inner vertex of valence three, when no sharp edge is present, according to the invention.
Figure 11:
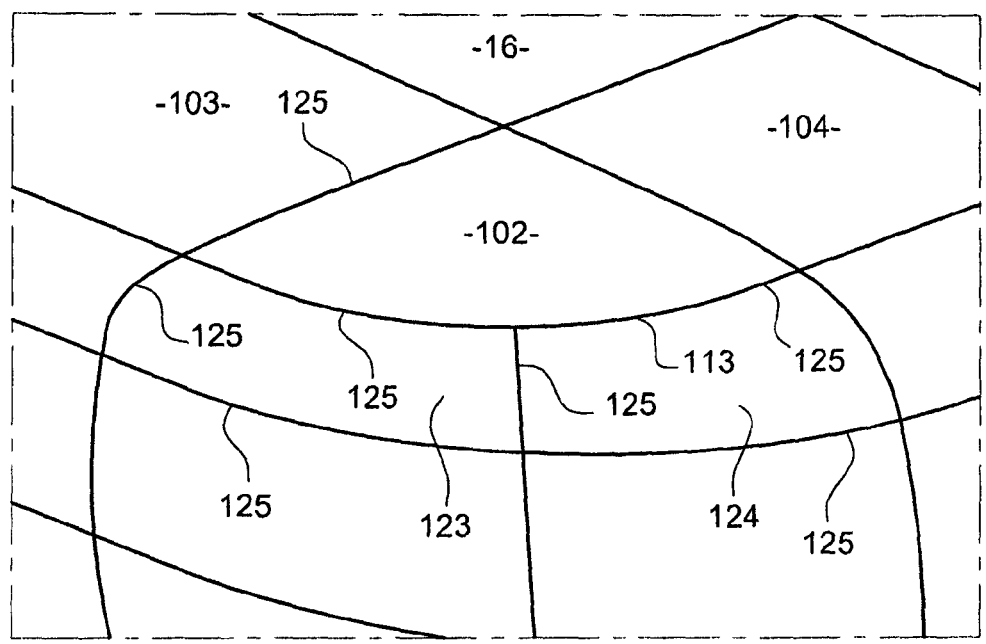

FIGS. 10-11 exemplify the creation of a trimmed patch 102 near an extraordinary inner vertex of valence three (not shown).

First, one of the initial three patches 105-107 generated around the critical inner vertex of valence three (that is, vertex 101) is chosen to be trimmed. This choice can be made via interaction with a user or automatically based on area criteria. For example: the face of the base-mesh having the biggest area (e.g. the face corresponding to patch 105) will be chosen to produce a trimmed patch.

Next, an untrimmed surface 111 is built from boundaries 103a, 103b, 104a, 104b of surrounding regular patches 103, 104. This can be achieved using known algorithms like sweeping or lofting operators.

The sweeping algorithm relies on defining multiple guides, here for instance from surrounding boundaries. Similarly, the loft algorithm comprises filling an area according to at least two curves, which will also be based on boundaries of surrounding regular patches. Typically, the sweeping operator matches the surface 111 to the base mesh. For example, the sweeping operator may take into account the mesh as a constraint: it is fitted to the mesh. As a result, the surface meets the curves of the mesh and is constrained by surfaces abutting said curves, so as to ensure curve continuity.

This patch (surface) 111 is then trimmed according to curve 113 built from boundaries of surrounding patches 103, 104. Typically, tangents (along 103a and 104a) and edges lengths (103b and 104b) of adjacent patches can be involved in the construction of the trimming curve, as illustrated with arrows in FIG. 10.

Next, in reference to FIG. 11, the resulting trimmed patch is patch 102. Two other patches 123, 124 are then constructed using such operators as sweep or loft and taking as input boundaries of the surrounding patches. Note that only one patch could be contemplated in a variant, which would correspond to the area of both patch 123 and 124 in FIG. 11. The use of such swept or lofted surfaces can produce G2 curvature continuities or even more at the patch connections 125.

Figure 12:
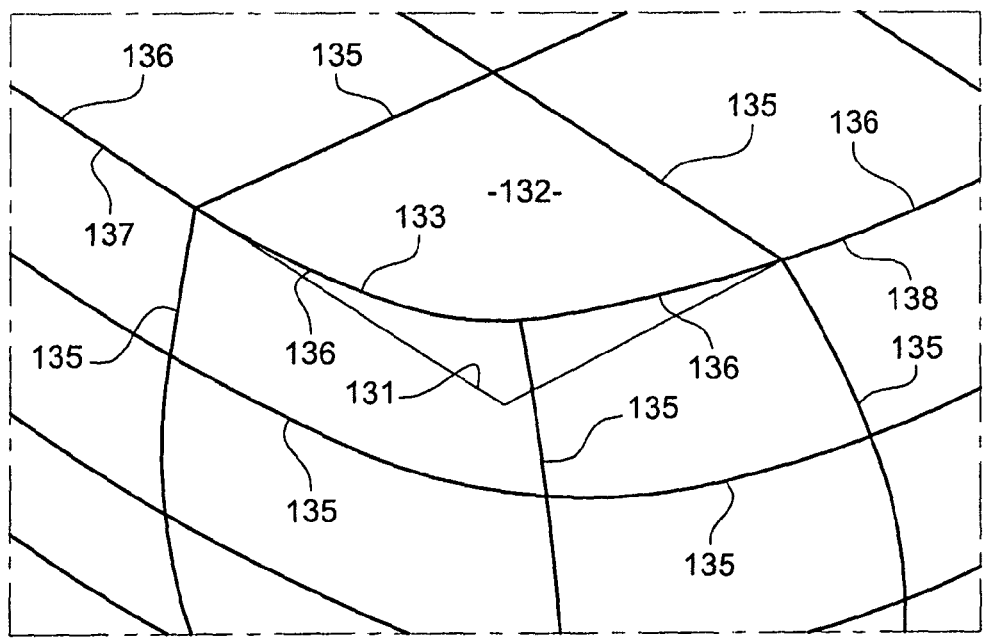
FIG. 12 shows a patch being trimmed near an extraordinary vertex of valence three, when sharp edges are present, according to the invention.

In reference to FIG. 12, we may now consider an example of a patch 132 trimmed near an extraordinary vertex of valence three, when sharp edges 137, 138 are present. In a same way as in FIG. 10-11, the principle is to build a trimmed patch 132 according to a trimming curve 133. The patch to be trimmed is defined by the face being in the vicinity of the valence three vertex (not shown, for clarity) and joining the two sharp edges 137, 138. With the same methodology as before, a surface 131 is build, using a sweeping of lofting operator. Convenient boundaries are further used to define the trimming curve 133, whereby relimiting the patch 132 is made possible. As a result, sharp connections 136 are G0 continuous (by definition of sharp edges), whereas connections 135 besides sharp edges can be made G2 or G3 continuous. Moreover, the use of a trimmed patch 132 solves then the offset problem.

Other examples of more involved parametric surfaces can be contemplated. For instance, a patch can be trimmed near an extraordinary inner vertex of valence five.

Such a case is obviously more involved than the previous ones as it requires more construction. However, the principle is the same, that is, relies on steps of:

- constructing patches to be trimmed (three patches are likely to be trimmed in this case, chosen e.g. according to patch areas or via user-interaction);
- constructing trimming curves and trimming the patches accordingly; and
- constructing complementary adjacent loft or swept surfaces (patches). Curvature continuity (G2) can accordingly be achieved.

Similarly, the above method applies for inner vertex of valence five and sharp edges, which further allows for solving the offset problem.

As an example of algorithm allowing to reach a prescribed continuity (for example G2 or more), the above method may further include the following steps.

First, the patches may be worked so as to have an internal continuity Cj at least equal to the required continuity Gi. It is thereby meant that j is greater or equal to i, that is, said internal continuity at least encompasses the required geometrical continuity. In contrast, the geometrical continuity between at least two elementary surfaces, across a common edge, is likely to be less than the required continuity Gi. Said patches have their own edges, with vertices joining adjacent edges. Further, for each singular vertex (that is, a vertex joining at least one edge across which the continuity is less than the required continuity Gi), the method may comprise a step of defining a system of equations linking parameters (including e.g. position coordinates of the control points) of the patches across edges joined to said extraordinary vertex and enforcing the required geometrical continuity across said joined edges. Next, the method may include a step of solving the system of equations to obtain said parameters.

Thus, the algorithm is local in spirit, a system of equations is defined and solved for each singular vertex. It further considers both open and closed vertices; open vertices are not discarded. In addition, formulating local equations allows for a linear resolution, which in turn critically simplifies and speeds up the process. Upon completion of the method, the target continuity is reached, owing to the nature of said systems of equations.

Preferably, each face of the base mesh is converted into a respective patch. Such a conversion scheme hence allows for working from a base mesh having an arbitrary topology and possibly using Catmull-Clark subdivision surfaces. Here, the face-patch mapping provides that the initial topology is respected.

The above method and variants are likely to be implemented within a suitable graphical user interface, allowing for 3D representation the base mesh, possibly subdivided, and patches.

A suitable CAD-like interface may be provided with standard menu bars as well as bottom and side toolbars. Such menu- and toolbars may for instance contain a set of user-selectable icons, each icon being associated with one or more operations or functions, as known in the art.

Some of these icons are for instance associated with software tools, adapted for editing and/or working on a modeled product or parts of product. The software tools in question may be grouped into workbenches. Otherwise put, each workbench comprises a different subset of software tools. In particular, one of these can be an edition workbench, suitable for editing geometrical features of the modeled product. In operation, a designer may for example pre-select a part of the product and then initiate an operation (e.g. change the dimension, color, etc.) by selecting an appropriate icon. For example, typical CAD operations are the modeling of the punching or the folding of a 3D modeled object displayed on the screen.

The GUI may for example display data related to the displayed product as a "feature tree", as well as their 3D representation. The GUI may further show various types of graphic tool, for example for facilitating 3D orientation of the object, for triggering a simulation of an operation of an edited product or render various attributes of the displayed product.

As an example of embodiment, the method of the invention is implemented in a computer network comprising user computers and one or more product data management (PDM) system. The user computers are in communication with the PDM system. The PDM system may for example be located at a backbone of the network. The PDM system allows for the management of numerous documents, relations and data, possibly hierarchically interrelated. Such a PDM system is equipped with a product lifecycle database having data related to modeled products, assemblies and product parts, which are likely to be edited by a designer. A plurality of users may thus work in a collaborative way, on different parts/products/assemblies.

The invention is not limited to the preferred embodiments described in reference to the drawings. Notably, the base mesh could be obtained from a mesh pattern and according to a symmetry operation, and this, before subdividing the base mesh. The resulting base mesh would hence be symmetric with respect to said symmetry operation.

Figure 13:
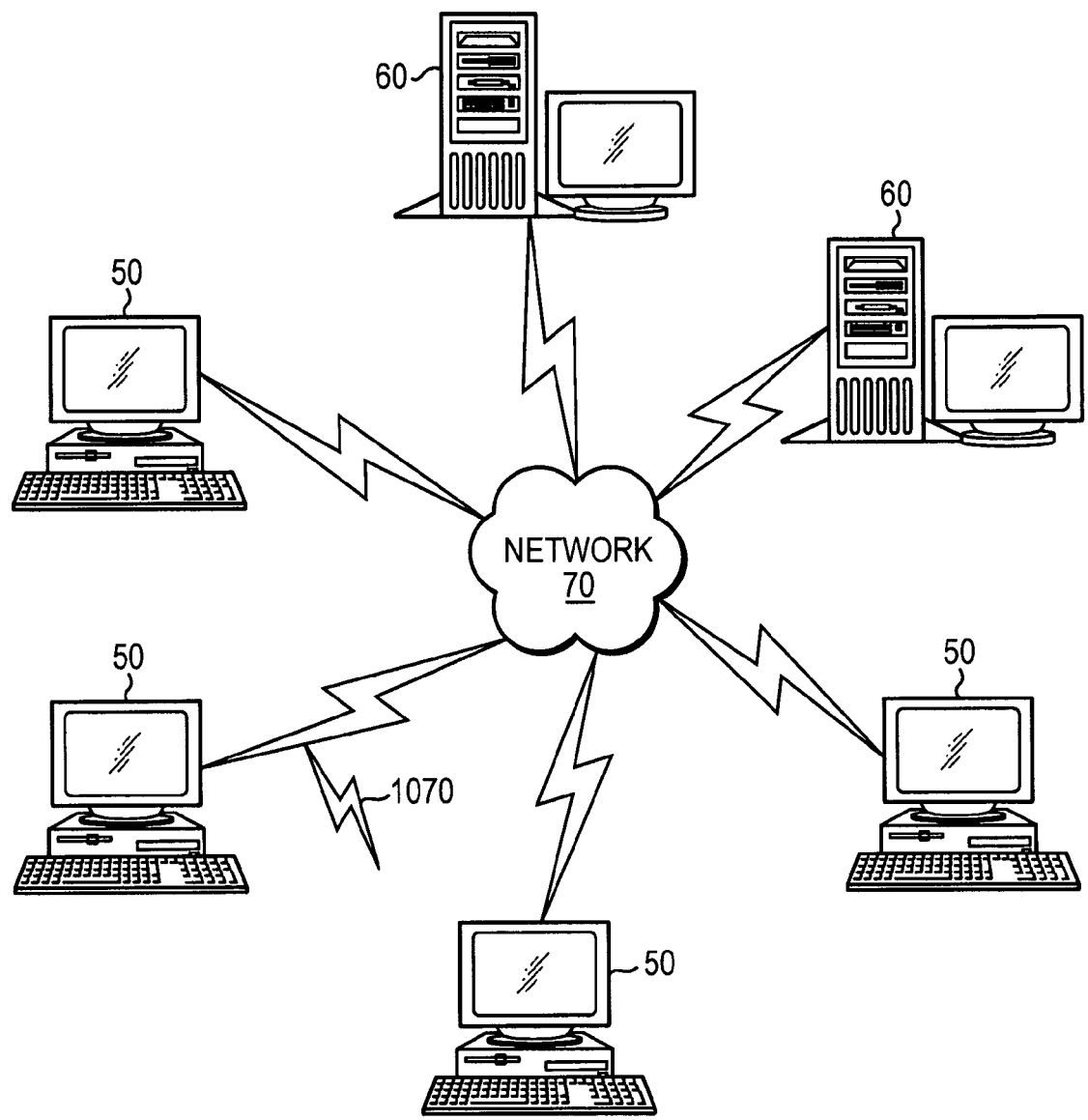
FIG. 13 is a schematic view of a computer network in which embodiments of the present invention may be implemented.

FIG. 13 illustrates a computer network or similar digital processing environment in which the present invention may be implemented.

Client computer(s) 50 and server computer(s) 60 provide processing, storage, and input/output devices executing application programs and the like. Client computer(s) 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 14:
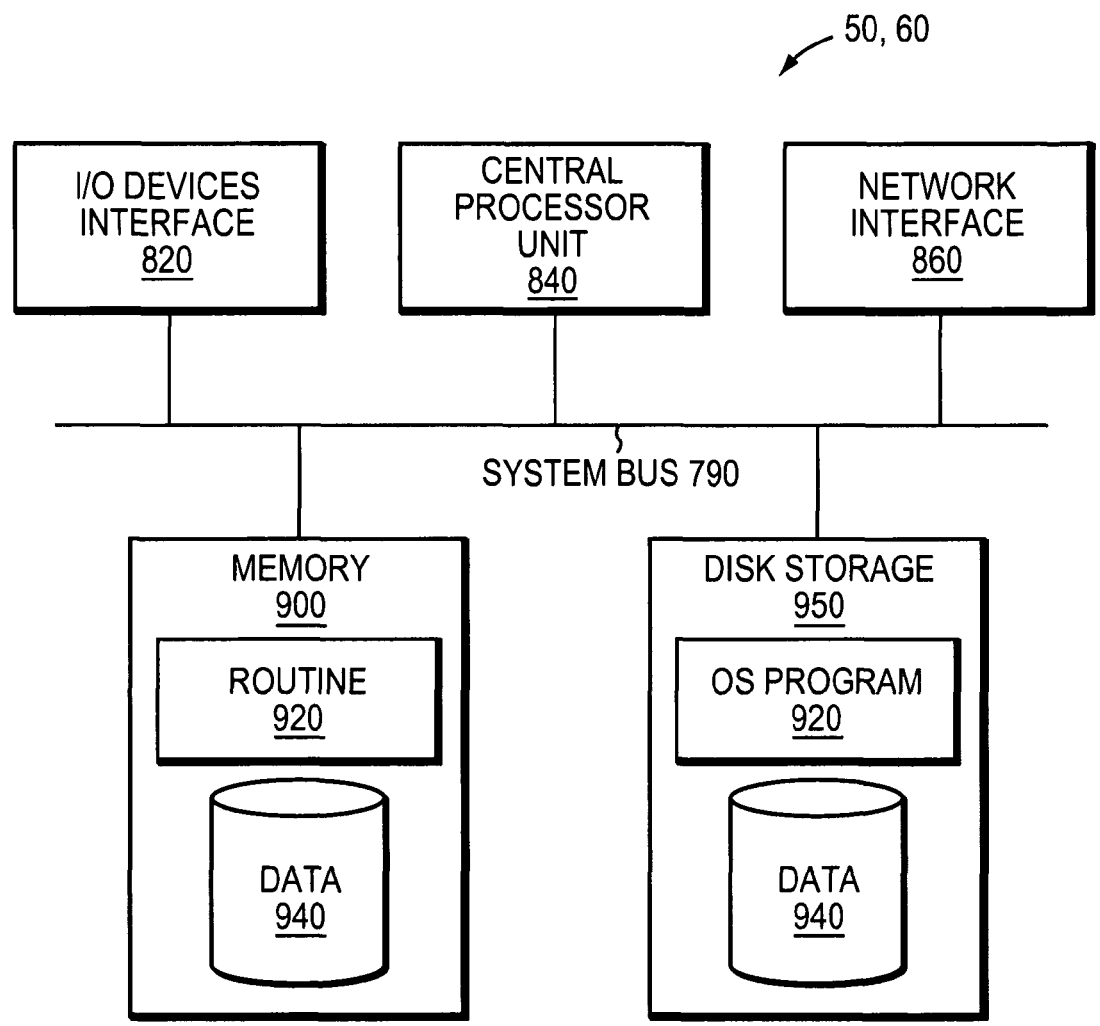
FIG. 14 is a block diagram of a computer node of the network of FIG. 13.

FIG. 14 is a diagram of the internal structure of a computer (e.g., client processor 50 or server computers 60) in the computer system of FIG. 13. Each computer 50, 60 contains system bus 790, where a bus is a set of hardware lines used for data transfer among the components of a computer or processing system. Bus 790 is essentially a shared conduit that connects different elements of a computer system (e.g., processor, disk storage, memory, input/output ports, network ports, etc.) that enables the transfer of information between the elements. Attached to system bus 790 is I/O device interface 820 for connecting various input and output devices (e.g., keyboard, mouse, displays, printers, speakers, etc.) to the computer 50, 60. Network interface 860 allows the computer to connect to various other devices attached to a network (e.g., network 70 of FIG. 13). Memory 900 provides volatile storage for computer software instructions 920 and data 940 used to implement an embodiment of the present invention (e.g., method/process detailed above in FIGS. 1 through 12). Disk storage 950 provides non-volatile storage for computer software instructions 920 and data 940 used to implement an embodiment of the present invention. Central processor unit 840 is also attached to system bus 790 and provides for the execution of computer instructions.

In one embodiment, the processor routines 920 and data 940 are a computer program product (generally referenced 920), including a computer readable medium (e.g., a removable storage medium such as one or more DVD-ROM's, CD-ROM's, diskettes, tapes, etc.) that provides at least a portion of the software instructions for the invention system. Computer program product 920 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 1070 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 920.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 920 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 13 and 14 are for purposes of illustration and not limitation of the present invention.

The invention can take the form of a hardware embodiment, a software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code or code means for use by or in connection with a computer or any instruction execution system. For the purposes of this description, a computer-usable or computer readable medium can be any apparatus that can contain, store, communicate, propagate, or transport the invention program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk, e.g., read only memory (CD-ROM), read/write (CD-R/W) and/or DVD.

What is claimed is:

1. A computer-implemented method of creating a parametric surface, comprising the steps of:
   in a computer,
   (a) providing a base mesh having a plurality of outer or inner vertices with valence greater than two, said vertices defining faces and at least one of said vertices being an extraordinary vertex defined as being different from:
   an outer vertex with valence two,
   an outer vertex with valence three, and
   an inner vertex with valence four;
   (b) converting faces of the base mesh into parametric elementary surfaces;
   (c) trimming at least one of said parametric elementary surfaces located in the vicinity of said extraordinary vertex, according to:
      at least two parametric elementary surfaces adjacent to said at least one parametric elementary surface and the base mesh; and
   (d) constructing at least one parametric elementary surface, adjacent to said trimmed parametric elementary surface, in a manner wherein the constructed parametric elementary surfaces and the trimmed parametric elementary surface form a parametric surface, and
   wherein the trimming enables a certain level of geometric continuity of the parametric surface to result.

2. The method according to claim 1, wherein the step of trimming comprises steps of:
   defining said at least one parametric elementary surface according to the base mesh;
   defining a trimming curve within said at least one parametric elementary surface according to said adjacent parametric elementary surfaces; and
   relimiting said at least one parametric elementary surface according to the defined trimming curve.

3. The method according to claim 2, wherein the step of defining said at least one parametric elementary surface uses a sweeping algorithm, said sweeping algorithm comprising:
   defining multiple guides from boundaries of surrounding parametric elementary surfaces; and
   sweeping a profile curve along said multiple guides.

4. The method according to claim 2, wherein the step of defining said at least one parametric elementary surface uses a loft algorithm, said loft algorithm comprising filling an area according to at least two curves defined from boundaries of surrounding parametric elementary surfaces.

5. The method according to claim 2, wherein the step of defining said at least one parametric elementary surface comprises matching said at least one parametric elementary surface with the base mesh.

6. The method according to claim 5, wherein said trimming curve is further defined according to lengths of edges separating said at least one parametric elementary surface from said at least two adjacent parametric elementary surfaces.

7. The method according to claim 1, wherein said at least one parametric elementary surface in the vicinity of said extraordinary vertex is chosen according to an area thereof.

8. The method according claim 7, wherein the formed parametric surface is created so as to have a certain Gi geometrical continuity.

9. The method of claim 1, wherein the base mesh is subdivided according to the Catmull-Clark subdivision rules.

10. The method of claim 1, wherein, at the step of converting, each parametric elementary surface has:
    elementary edges, with elementary vertices joining adjacent elementary edges; and
    an internal continuity Cj at least equal to a certain geometrical continuity Gi, the geometrical continuity between at least two parametric elementary surfaces, across an elementary edge, being less than the certain geometrical continuity Gi; and
wherein the method further comprises, for each singular elementary vertex joining at least one elementary edge across which the internal continuity between adjacent elementary surfaces is less than the certain geometrical continuity Gi:

defining a system of equations linking parameters of the parametric elementary surfaces across edges joined to said singular elementary vertex and enforcing the certain geometrical continuity Gi across the joined edges; and solving the system of equations to obtain the parameters.

11. The method of claims 1, further comprising a step of providing a graphical user interface adapted for:

displaying said base mesh and parametric elementary surfaces.

12. The method according to claim 11, wherein said base mesh and parametric elementary surfaces are displayed in 3D.

13. The method of claim 1, wherein the step of providing the base mesh comprises steps of:

identifying a mesh pattern; and creating a base mesh from the mesh pattern according to a symmetry operation, said base mesh being symmetric with respect to said symmetry operation.

14. A computer program product, comprising a non-transitory computer storage medium having computer readable code means, wherein the computer readable code means when executed on a computer causes the steps of:

(a) providing a base mesh having a plurality of outer or inner vertices with valence greater than two, said vertices defining faces and at least one of said vertices being an extraordinary vertex defined as being different from:

an outer vertex with valence two, an outer vertex with valence three, and an inner vertex with valence four;

(b) converting faces of the base mesh into parametric elementary surfaces;

(c) trimming at least one of said parametric elementary surfaces located in the vicinity of said extraordinary vertex, according to:

at least two parametric elementary surfaces adjacent to said at least one parametric elementary surface and the base mesh; and (d) constructing at least one parametric elementary surface, adjacent to said trimmed parametric elementary surface, in a manner wherein the constructed parametric elementary surfaces and the trimmed parametric elementary surface form a parametric surface, said trimming enabling a certain level of geometric continuity of the parametric surface to result.

15. The computer program product of claim 14 wherein, the step of trimming includes:

defining said at least one parametric elementary surface according to the base mesh;

defining a trimming curve within said at least one parametric elementary surface according to said adjacent parametric elementary surfaces; and relimiting said at least one parametric elementary surface according to the defined trimming curve.

16. The computer program product of claim 14 further comprising a step of providing a graphical user interface adapted for:

displaying said base mesh and parametric elementary surfaces.

17. The computer program product of claim 14, wherein the step of providing the base mesh comprises steps of:

identifying a mesh pattern; and creating a base mesh from the mesh pattern according to a symmetry operation, said base mesh being symmetric with respect to said symmetry operation.

18. Computer apparatus creating a parametric surface comprising:

base mesh means providing a base mesh having a plurality of outer or inner vertices with valence greater than two, said vertices defining faces and at least one of said vertices being an extraordinary vertex defined as being different from:

an outer vertex with valence two, an outer vertex with valence three, and an inner vertex with valence four;

face conversion means for converting faces of the base mesh into parametric elementary surfaces;

a trimmer trimming at least one of said parametric elementary surfaces located in the vicinity of said extraordinary vertex, according to:

at least two parametric elementary surfaces adjacent to said at least one parametric elementary surface and the base mesh; and construction means constructing at least one parametric elementary surface, adjacent to said trimmed parametric elementary surface, in a manner wherein the constructed parametric elementary surfaces and the trimmed parametric elementary surface form a parametric surface, said trimmer enabling the parametric surface to have a desired level of geometric continuity.

19. Computer apparatus as claimed in claim 18 wherein the trimmer further:

defines said at least one parametric elementary surface according to the base mesh;

defines a trimming curve within said at least one parametric elementary surface according to said adjacent parametric elementary surfaces; and relimits said at least one parametric elementary surface according to the defined trimming curve.

20. Computer apparatus as claimed in claim 18 further comprising user interface means for displaying said base mesh and parametric elementary surfaces.

* * * * *